United States Patent
Choe et al.

(10) Patent No.: US 8,736,820 B2
(45) Date of Patent: May 27, 2014

(54) APPARATUS AND METHOD FOR DISTINGUISHING GROUND AND OBSTACLES FOR AUTONOMOUS MOBILE VEHICLE

(75) Inventors: Tok Son Choe, Daejeon (KR); Jeong Sook Chae, Daejeon (KR); Yong Woon Park, Daejeon (KR); Jun Kim, Daejeon (KR)

(73) Assignee: Agency for Defense Development, Daejeon (KR)

( * ) Notice: Subject to any disclaimer, the term of this patent is extended or adjusted under 35 U.S.C. 154(b) by 281 days.

(21) Appl. No.: 13/254,099

(22) PCT Filed: Mar. 3, 2010

(86) PCT No.: PCT/KR2010/001300
§ 371 (c)(1),
(2), (4) Date: Aug. 31, 2011

(87) PCT Pub. No.: WO2010/101393
PCT Pub. Date: Sep. 10, 2010

(65) Prior Publication Data
US 2011/0309967 A1    Dec. 22, 2011

(30) Foreign Application Priority Data
Mar. 3, 2009 (KR) .................. 10-2009-0018131

(51) Int. Cl.
G01C 3/08    (2006.01)
(52) U.S. Cl.
USPC ....... 356/5.01; 356/3.01; 356/3.09; 356/4.01; 356/4.07; 356/5.09; 356/9; 356/625

(58) Field of Classification Search
USPC ........... 356/5.01, 3.01–3.09, 4.01, 4.07, 5.09, 356/9, 625
See application file for complete search history.

(56) References Cited

U.S. PATENT DOCUMENTS

| | | | |
|---|---|---|---|
| 5,808,728 A * | 9/1998 | Uehara | 356/5.01 |
| 6,888,622 B2 * | 5/2005 | Shimomura | 356/4.01 |
| 7,706,572 B2 * | 4/2010 | Hattori et al. | 382/103 |
| 8,126,599 B2 * | 2/2012 | Coulmeau et al. | 701/16 |

FOREIGN PATENT DOCUMENTS

| | | |
|---|---|---|
| JP | 06-87377 | 3/1994 |
| JP | 10-059120 | 3/1998 |
| JP | 2003-057340 | 2/2003 |
| JP | 2007-178183 | 7/2007 |

* cited by examiner

*Primary Examiner* — Luke D Ratcliffe
*Assistant Examiner* — Samantha K Abraham
(74) *Attorney, Agent, or Firm* — Harness, Dickey & Pierce, P.L.C.

(57) ABSTRACT

Disclosed is apparatus for distinguishing between ground and an obstacle for autonomous mobile vehicle, comprising an upper 2D laser radar 1, a lower 2D laser radar 2, and a processing unit 10, the processing unit 10 comprising a distance data receiving part 11, an inclination calculating part 12, a ground and obstacle determining part 13, and a transmitting part. Also disclosed is a method for distinguishing between ground and an obstacle for autonomous mobile vehicle by using the apparatus for distinguishing between ground and an obstacle for autonomous mobile vehicle of claim 1, in which the detected object is determined as an obstacle when the actual inclination (g) of the detected object is larger than the reference inclination, and as ground when the actual inclination (g) of the detected object is smaller than the reference inclination.

3 Claims, 3 Drawing Sheets

APPARATUS AND METHOD FOR DISTINGUISHING GROUND AND OBSTACLES FOR AUTONOMOUS MOBILE VEHICLE

TECHNICAL FIELD

The present invention relates to apparatus and a method for distinguishing ground and obstacles for an autonomous mobile vehicle such as a military vehicle, which is based on the 2 dimensional World Model using a cylindrical coordinate system with the vehicle at the center. The present method determines whether an object detected by a 2D laser radar is an obstacle that hinders the operation of the vehicle, or a planar ground.

The cylindrical coordinate system with the vehicle at the center can be generated by using the distance data obtained by the 2D laser radar which is arranged in parallel with the horizontal plane of the vehicle or oriented to the front direction of the moving vehicle.

The World Model means a 3 dimensional map including elevation information or a 2 dimensional map having marks of obstacles. The World Model is generated by using one or more sensors comprising one or more types of sensors such as CCD, IR, 2D laser radar, normal radar, or 3D laser radar to recognize surrounding environment, and by marking the recognized results in the Cartesian or cylindrical coordinate system.

BACKGROUND ART

Conventional method for detecting obstacles for autonomous mobile vehicle uses various sensors such as CCD, 2D laser radar, etc. It also determines every detected object, which is not planar, is regarded as an obstacle (Documents 1 and 2) based on the assumption that the operating environment is relatively planar. This method of detecting obstacles is appropriate for use indoors or in the city environment, where the amount of data to be processed is small and the calculation time for the data is relatively short.

In non-paved roads or field areas, the conventional method generates a 3 dimensional World Model including elevation information by using sensors (CCD, IR, laser radar, radar, etc.). This method also detects an obstacle by analyzing drivability based on the World Model (Documents 3 and 4). In Addition, this method requires much calculation time since a lot of data from various sensors should be obtained and analyzed.

Additionally, in the case of application where detecting and avoiding obstacles that emerge suddenly at a short distance, obstacles are detected by using one or more of 2D laser radars and avoidance is carried out for a fast response on the assumption that the driving environment is relatively planar (Documents 5 and 6).

The conventional methods, however, are not appropriate for the autonomous mobile vehicle such as armored vehicle which performs an abrupt movement on a non-paved road or field area since only one 2D laser radar built in the autonomous mobile vehicle, or a plurality of 2D laser radars arranged in parallel with the base plane of the vehicle is used. When lateral or longitudinal force acts on the vehicle due to an abrupt change of direction or speed, the autonomous vehicle is slanted by the lateral or longitudinal force in the right or left direction (roll direction), or in the front or rear direction (pitch direction). In this case, a relatively planar ground is erroneously recognized as an obstacle.

FIG. 5 illustrates the radiation pattern of beam from the 2D laser radars, which are arranged in parallel with the base plane of the autonomous vehicle when the right and left suspension devices are pressed differently due to an abrupt change of direction of the vehicle. It can be seen from the figure that the distance data between left and right direction are different although the ground is planar when the autonomous vehicle is inclined in the roll direction. As a result, planar ground can be erroneously recognized as an obstacle when the autonomous vehicle is inclined in the roll direction. Therefore, the vehicle will make an avoidance action although there is no obstacle.

PRIOR ART DOCUMENT OF THE INVENTION

[Document 1] Badal, S., Ravela, S., Draper, B. and Hanson, A., "A Practical Obstacle Detection and Avoidance System", In 2nd IEEE Workshop on Application of Computer Vision, 1994.

[Document 2] Broggi, A., Bertozzi, M., Fascioli, A., Guarino Lo Bianco, C. and Piazzi, A., "Visual Perception of Obstacles and Vehicles for Platooning", IEEE Trans. Intell. Transport. Sys. 1(3), 2000.

[Document 3] Lacaze, A., Murphy, K. and Del Giorno, M., "Autonomous Mobility for the DEMO III Experimental Unmanned Vehicle.", Association for Unmanned Vehicle Systems—Unmanned Vehicle, 2002.

[Document 4] Hong, T., Abrams, M., Chang, T. and Shneirer, M. O., "An intelligent World Model for Autonomous Off-Road Driving", Computer Vision and Image Understanding, 2000.

[Document 5] Kim, Jaewhan, "Detection of Obstacle and Generation of Path for Unmanned Vehicle by using a plurality of laser scanners", Kookmin Univ. Graduate School of Vehicle Engineering, Paper for Master's degree, 2008.

[Document 6] Won-Jong Sohn, Keum-Shik Hong, "Moving Obstacle Avoidance Using a LRF Sensor", SICE-ICASE 2006 International Joint Conference, pp 5957-5962, 18-21 Oct. 2006.

DISCLOSURE OF INVENTION

Technical Problem

As described above regarding the conventional method of detecting obstacles, the autonomous mobile vehicle is inclined in the right or left direction (roll direction) or in the front or rear direction (pitch direction) by the lateral or longitudinal force resulting from an abrupt change of direction or speed, thereby changing the orientation angle of the 2D laser radar. As a result, when the autonomous mobile vehicle is inclined, the distance (distance data) to the detected object (for example, the obstacle or ground in front of the vehicle) becomes shorter than the distance detected when the vehicle is not inclined. So, in the conventional method of detecting obstacles, there have been cases where ground is erroneously recognized as an obstacle when the vehicle is autonomously operated on non-paved road or on field where the ground plane is not sufficiently planar.

Solution to Problem

Therefore, the objective of the present invention is to solve the problem that can occur when the autonomous mobile vehicle is operated on the non-paved road or field.

According to the features of present invention, distance data is obtained by using two 2D laser radars which are arranged at upper and lower position of a vertical line and oriented toward the front direction with different orientation angles. Then the actual inclination of the detected object is calculated by using the distance data obtained by the 2D laser radars, determination is made whether the detected object is an obstacle or ground based on the actual inclination calculated. When the object is determined as ground, the arbitrary maximum value of the distance that the corresponding 2D laser radar can have is stored as a changed distance data on the virtual 2D laser radar which is assumed to be arranged on the same location as the lower 2D laser radar so that the relatively planar ground is not erroneously recognized as an obstacle.

More specifically, the apparatus for distinguishing ground and obstacles for an autonomous mobile vehicle according to the present invention comprises an upper 2D laser radar 1 installed on the front upper portion of the autonomous mobile vehicle arranged with predetermined orientation angle ($\theta_1$) with respect to the horizontal base plane of the vehicle (or ground), a lower 2D laser radar 2 installed on the front lower portion of the autonomous mobile vehicle at the location vertically below the upper 2D laser radar 1 with a predetermined vertical distance ($d_{offset}$) and arranged in parallel with the horizontal base plane of the vehicle, and a processing unit 10 installed on the autonomous mobile vehicle for carrying out predetermined data processing, the processing unit 10 comprising a distance data receiving part 11 which receives distance data $r_1$, $r_2$ to the object which are detected by the upper 2D laser radar 1 and the lower 2D laser radar 2, an inclination calculating part 12 which calculates actual inclination (g) of the detected object based on the distance data $r_1$, $r_2$ received from the distance data receiving part 11, the orientation angle ($\theta_1$) and the vertical distance ($d_{offset}$), a ground and obstacle determining part 13 which determines whether the detected object is ground or an obstacle by comparing the actual inclination (g) of the detected object received from the inclination calculating part 12 and the predetermined reference inclination, and generates a distance data for a virtual 2D laser radar which is assumed to be arranged on the same location as the lower 2D laser radar, and a transmitting part 14 which transmits the distance data for the virtual 2D laser radar which is assumed to be arranged on the same location as the lower 2D laser radar, generated by the ground and obstacle determining part 13, to a collision avoiding processing unit 20 of the autonomous mobile vehicle. Here, the predetermined reference inclination is obtained from actually measured inclinations on artificial obstacles which are dangerous to the autonomous vehicle.

The method for distinguishing between ground and an obstacle for autonomous mobile vehicle comprises a step of obtaining distance data in which distance data $r_1$, $r_2$ from the upper 2D laser radar 1 and the lower 2D laser radar 2 to the detected object is obtained by using the upper 2D laser radar 1 and the lower 2D laser radar 2 installed on front side of the autonomous mobile vehicle, a step of calculating inclination in which the actual inclination (g) of the detected object is calculated by the inclination calculating part 12 of the apparatus for distinguishing between ground and an obstacle for autonomous mobile vehicle by using the distance data $r_1$, $r_2$, the orientation angle ($\theta_1$) of the upper 2D laser radar 1, and the vertical distance ($d_{offset}$) between the upper 2D laser radar 1 and the lower 2D laser radar 2, and a step of determining ground and an obstacle in which the ground and obstacle determining part 13 of the processing unit determines the detected object as an obstacle when the actual inclination (g) of the detected object is larger than the reference inclination, and determines the detected object as ground when the actual inclination (g) of the detected object is smaller than the reference inclination.

Also in the above method, it is preferable that the minimum value of the obtained distance data ($r_1$, $r_2$) is stored as a distance data at the angle of the virtual 2D laser radar which is assumed to be arranged on the same location as the lower 2D laser radar when the actual inclination (g) of the detected object at a certain angle is larger than predetermined reference inclination, and the arbitrary maximum value of the distance that the corresponding 2D laser radar can have is stored as a distance data at the angle of the virtual 2D laser radar which is assumed to be arranged on the same location as the lower 2D laser radar when the actual inclination (g) of the detected is smaller than predetermined reference inclination.

Advantageous Effects of Invention

According to the present invention, distance data is obtained by two 2D laser radars arranged with different orientation angles and determination is made based on the distance data whether the detected object is an obstacle or not, thereby removing the phenomena that an object is erroneously determined as an obstacle due to abrupt change of direction or velocity.

Also, the performance of autonomous driving of the vehicle on non-paved roads or field can be enhanced by measuring the inclination of the driving road (for example, ground) and determining the irregularity as an obstacle when the bend curve is abrupt.

This measured inclination of the driving road can be used as information for analyzing the driving performance of the autonomous vehicle or as a parameter for controlling the speed of the vehicle depending on the driving environment of the autonomous vehicle.

Also, the apparatus for detecting ground and obstacle for autonomous mobile vehicle of the present invention is cost-effective since only two laser radars and one processing unit are required.

DESCRIPTION ON THE NUMERALS IN THE DRAWINGS

Figure 1:
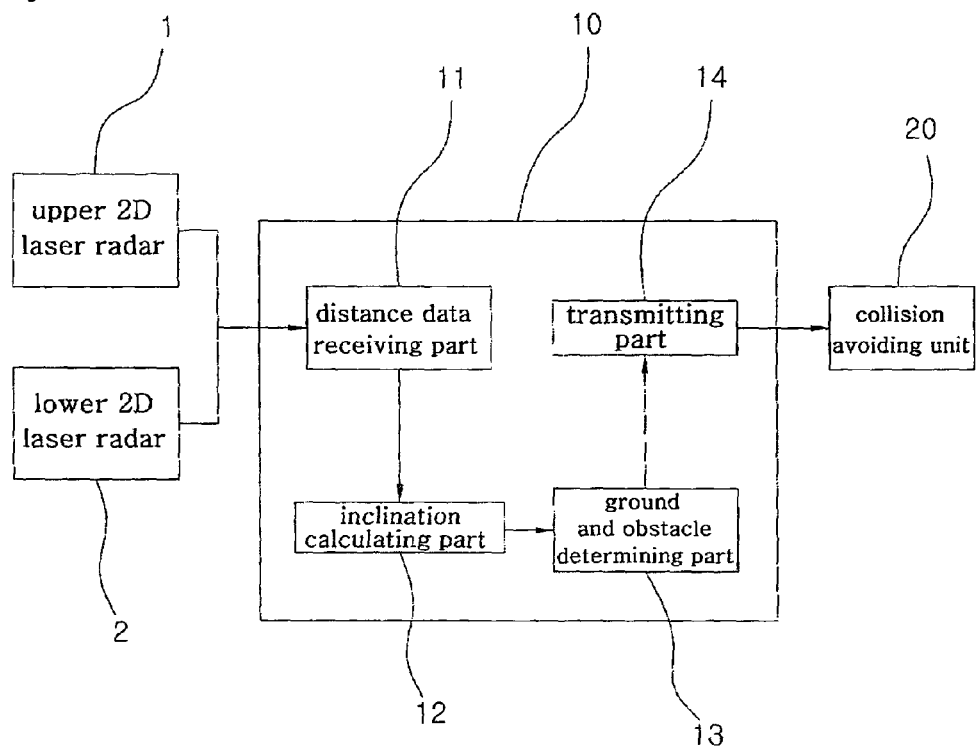
FIG. 1 is a block diagram showing the apparatus for distinguishing ground and obstacles for an autonomous mobile vehicle according to the present invention.

1. upper 2D laser radar
2. lower 2D laser radar
10. processing unit
11. distance data receiving part 12. inclination calculating part
13. ground and obstacle determining part
14. transmitting part
20. collision avoiding unit

BEST MODE FOR CARRYING OUT THE INVENTION

The apparatus and method for detecting ground and obstacle for autonomous mobile vehicle of the present invention will now be described in detail with reference to the drawings attached.

Figure 2:
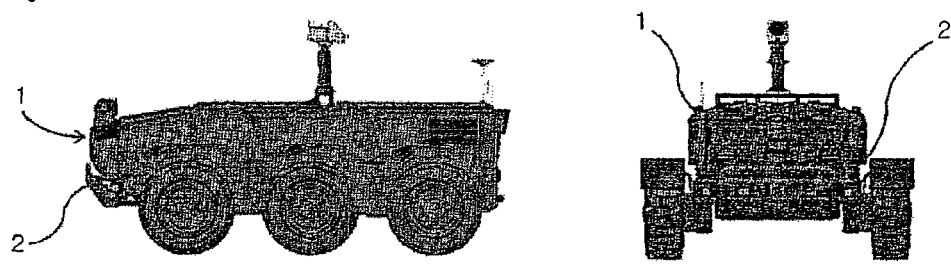
FIG. 2 is a front and side view showing the state in which two 2D laser radars comprising the apparatus for distinguishing ground and obstacles are installed on the autonomous vehicle.
Figure 3:
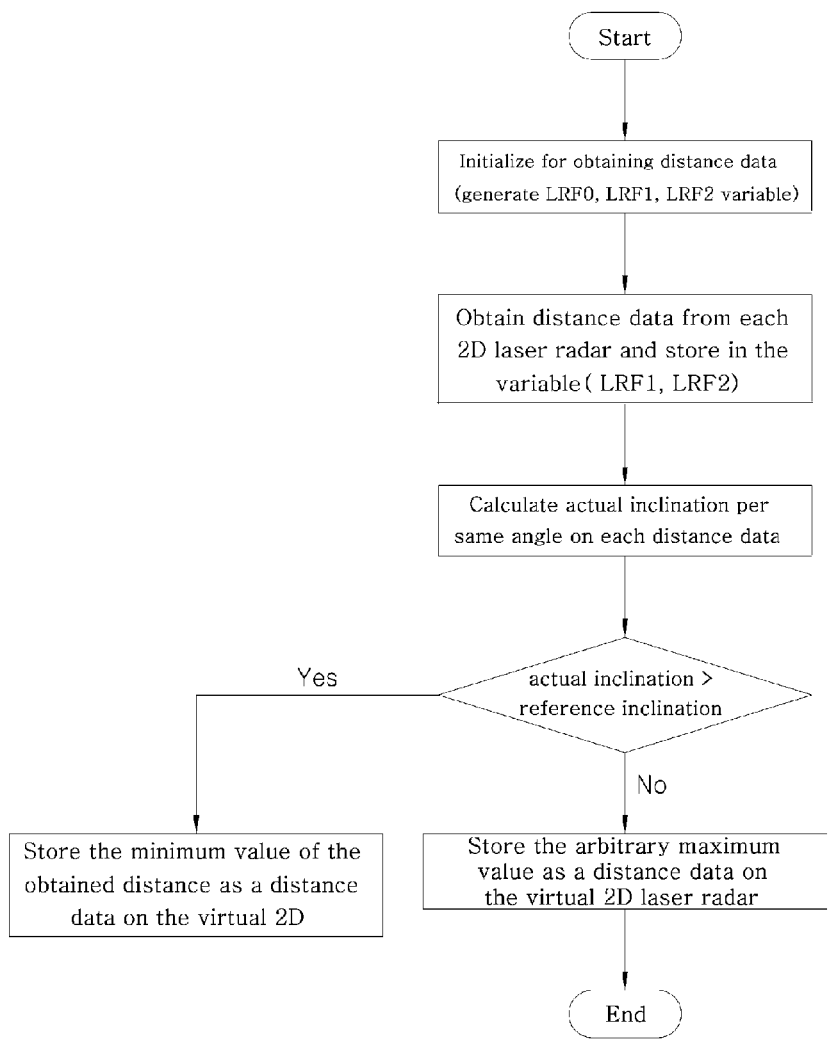
FIG. 3 is a flow chart showing the process of calculating the actual inclination of the detected object by the apparatus for distinguishing ground and obstacles for an autonomous mobile vehicle.
Figure 4:
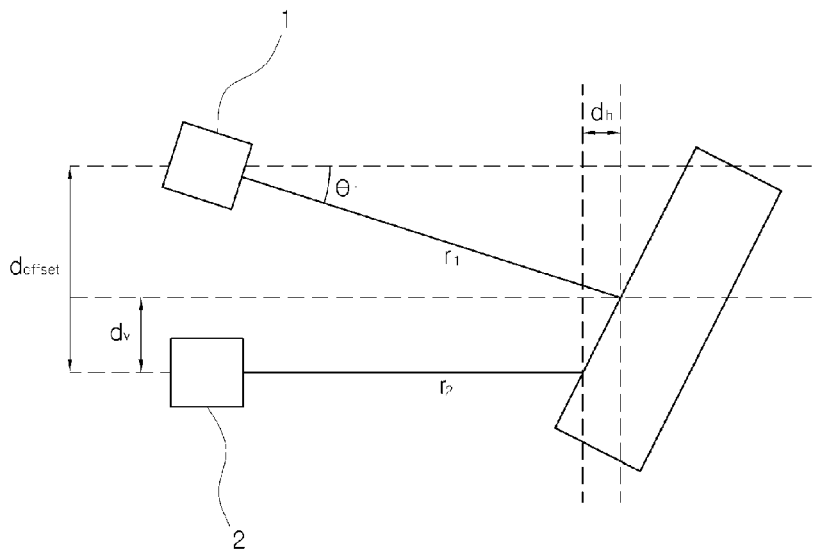
FIG. 4 conceptually illustrates how the distance data needed for the apparatus for detecting ground and obstacles to calculate the actual inclination of the detected object is obtained.
Figure 5:
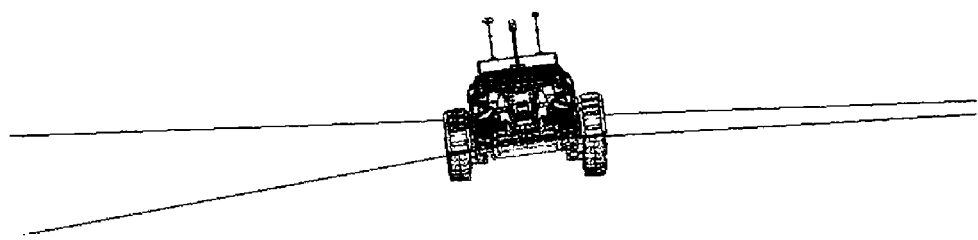
FIG. 5 illustrates the beam radiated from the 2D laser radars, which are arranged in parallel with the base plane of the autonomous vehicle, when the right and left suspension devices are pressed differently due to an abrupt change of direction of the vehicle.

FIG. 1 is a block diagram showing the apparatus for distinguishing ground and obstacles for an autonomous mobile vehicle according to the present invention, FIG. 2 is a front and side view showing the state in which two 2D laser radars comprising the apparatus for distinguishing ground and obstacles are installed on the autonomous vehicle, FIG. 3 is a flow chart showing the process of calculating the actual inclination of the detected object by the apparatus for distinguishing ground and obstacles for an autonomous mobile vehicle, and FIG. 4 conceptually illustrates how the distance data needed for the apparatus for detecting ground and obstacles to calculate the actual inclination of the detected object is obtained.

As can be seen in the figures, the apparatus for distinguishing ground and an obstacle for autonomous mobile vehicle of the present invention an upper 2D laser radar 1 installed on the front upper portion of the autonomous mobile vehicle arranged with predetermined orientation angle ($\theta_1$) with respect to the horizontal base plane of the vehicle, a lower 2D laser radar 2 installed on the front lower portion of the autonomous mobile vehicle at the location vertically below the upper 2D laser radar 1 with a predetermined vertical distance ($d_{offset}$) and arranged in parallel with the horizontal base plane of the vehicle, and a processing unit 10 installed on the autonomous mobile vehicle for carrying out predetermined data processing.

And the processing unit 10 comprises a distance data receiving part 11 which receives distance data $r_1$, $r_2$ to the object which are detected by the upper 2D laser radar 1 and the lower 2D laser radar 2, an inclination calculating part 12 which calculates actual inclination (g) of the detected object based on the distance data $r_1$, $r_2$ received from the distance data receiving part 11, the orientation angle ($\theta_1$) and the vertical distance ($d_{offset}$), a ground and obstacle determining part 13 which determines whether the detected object is ground or an obstacle by comparing the actual inclination (g) of the detected object received from the inclination calculating part 12 and the predetermined reference inclination, and generates a distance data for a virtual 2D laser radar which is assumed to be arranged on the same location as the lower 2D laser radar, the distance data being the minimum value of the distance data $r_1$, $r_2$ or the maximum value that corresponding 2D laser radar can have, and a transmitting part 14 which transmits the distance data for the virtual 2D laser radar which is assumed to be arranged on the same location as the lower 2D laser radar, generated by the ground and obstacle determining part 13, to a collision avoiding processing unit 20 of the autonomous mobile vehicle.

Therefore, when the detected object is determined to be an obstacle, the autonomous mobile vehicle can avoid collision through the control of the parts by the collision avoiding processing unit 20.

As shown in FIG. 2, when using 2D laser radar 1, 2 on the autonomous mobile vehicle that can operate on the non-paved road or field, the 2D laser radar 1, 2 are installed on the same vertical axis. The 2D laser radar 1, 2 are oriented in the same direction (front) but with different orientation angle. This is for calculating the actual inclination of the detected object by using the distance data $r_1$, $r_2$ obtained by each 2D laser radar 1, 2. 2D laser radar that can scan more than 100° sidewise is used here.

The apparatus for distinguishing between ground and an obstacle for autonomous mobile vehicle as described above determines whether an object is an obstacle or not as follows.

First, distance data $r_1$, $r_2$ from the upper and lower 2D laser radar 1, 2 installed on the vehicle to the detected object is obtained (step of obtaining distance data).

Then the actual inclination (g) of the detected object is calculated by the inclination calculating part 12 of the apparatus for distinguishing between ground and an obstacle for autonomous mobile vehicle by using the distance data $r_1$, $r_2$, the orientation angle ($\theta_1$) of the upper 2D laser radar 1, and the vertical distance ($d_{offset}$) between the upper 2D laser radar 1 and the lower 2D laser radar 2 (step of calculating inclination).

Finally, the ground and obstacle determining part 13 of the processing unit determines the detected object as an obstacle when the actual inclination (g) of the detected object is larger than the reference inclination, and determines the detected object as ground when the actual inclination (g) of the detected object is smaller than the reference inclination (step of determining ground and an obstacle).

EXAMPLE

One example of the method for distinguishing between ground and an obstacle for autonomous mobile vehicle using the above construction will be described in detail.

First, as shown FIG. 3, unprocessed front distance data is obtained by two 2D laser radars 1, 2 which are installed on the autonomous mobile vehicle.

The distance data obtained by the 2D laser radars are transferred to the processing unit 10 for predetermined data processing.

The processing unit 10 checks whether distance data has been received from each of the 2D laser radar 1, 2, and generates variables for storing distance data per angle from each 2D laser radar 1, 2, and variables for storing processed data for the virtual 2D laser radar which is assumed to be arranged on the same location as the lower 2D laser radar. For example, the distance data per angle of the upper 2D laser radar 1 is stored as LRF1, the distance data per angle of the lower 2D laser radar 2 as LRF2, and the variable for the virtual 2D laser radar which is assumed to be arranged on the same location as the lower 2D laser radar as LRF0.

Next, in the process of calculating the actual inclination of the detected object by using the distance data per angle of the each 2D laser radar 1, 2, orientation angle toward the ground of the upper 2D laser radar 1, and the difference of height of the upper and lower 2D laser radars 1, 2, the actual inclination of the detected object is calculated by comparing distance data of the same angle of LRF1 and LRF2.

The method of calculating the actual inclination of the detected object will be described in more detail with reference to FIG. 4.

The difference in vertical direction of the detected objects, dv, is represented by the following formula:

$$d_v = d_{offset} - r_1 \sin \theta_1 \qquad (1)$$

And the difference in horizontal direction of the detected objects, dh, is represented by the following formula:

$$d_h = r_1 \cos \theta_1 - r_2 \qquad (2)$$

where $r_1$ is the distance data received by the upper 2D laser radar 1, $r_2$ the distance data received by the lower 2D laser radar 2, $\theta_1$ the angle of the upper 2D laser radar 1 in the Pitch direction (the angle of orientation toward the ground), and $d_{offset}$ the difference of height of the two 2D laser radars 1, 2 in vertical direction.

The actual inclination of the detected object (g) is calculated by the following formula.

$$g = \frac{d_v}{d_h} \times 100 \quad (3)$$

When the actual inclination (g) of the detected object at a certain angle is larger than predetermined reference inclination, the minimum value of the obtained distance data ($r_1$, $r_2$) is stored as a distance data at the angle of the virtual 2D laser radar which is assumed to be arranged on the same location as the lower 2D laser radar. When the actual inclination (g) of the detected object is smaller than predetermined reference inclination, however, the arbitrary maximum value of the distance that the corresponding 2D laser radar can have is stored as a distance data at the angle of the virtual 2D laser radar which is assumed to be arranged on the same location as the lower 2D laser radar.

Also, when the actual inclination (g) of the detected object is larger than predetermined reference inclination, the detected object is determined to be an obstacle and the variable LRF0 of the virtual 2D laser radar which is assumed to be arranged on the same location as the lower 2D laser radar is given the minimum value of the distance data at the corresponding angle. On the contrary, when the actual inclination (g) of the detected object is smaller than predetermined reference inclination, the detected object is determined to be the ground and the variable LRF0 of the virtual 2D laser radar which is assumed to be arranged on the same location as the lower 2D laser radar is given, as a distance data at the corresponding angle, the arbitrary maximum value of the distance that the corresponding 2D laser radar can have.

The invention claimed is:

1. Apparatus for distinguishing between ground and an obstacle for autonomous mobile vehicle, which comprises:
    an upper 2D laser radar installed on the front upper portion of the autonomous mobile vehicle arranged with predetermined orientation angle $\theta_1$ with respect to the horizontal base plane of the vehicle,
    a lower 2D laser radar installed on the front lower portion of the autonomous mobile vehicle at the location vertically below the upper 2D laser radar with a predetermined vertical distance $d_{offset}$ and arranged in parallel with the horizontal base plane of the vehicle,
    and a processing unit installed on the autonomous mobile vehicle for carrying out predetermined data processing,
    the processing unit comprising a distance data receiving part which receives distance data $r_1$ to the object which is are detected by the upper 2D laser radar, and $r_2$ to the object which is detected by the lower 2D laser radar,
    an inclination calculating part which calculates actual inclination g of the detected object based on the distance data $r_1$, $r_2$ received from the distance data receiving part, the orientation angle $\theta_1$ and the vertical distance $d_{offset}$, wherein g is calculated by the following formula:

$$g = d_v/d_h \times 100$$

where, $d_v = d_{offset} - r_1 \sin \theta_1$, and
$d_h = r_1 \cos \theta_1 - r_2$, where $d_v$ is the difference in vertical direction between the distance data $r_1$ to the detected object and distance data $r_2$ to the detected object, and where $d_h$ is the difference in horizontal direction between the distance data $r_1$ to the detected object and distance data $r_2$ to the detected object,
    a ground and obstacle determining part determines whether the detected object is ground or an obstacle by comparing the actual inclination of the detected object received from the inclination calculating part and the predetermined reference inclination, and generates a distance data for a virtual 2D laser radar which is assumed to be arranged on the same location as the lower 2D laser radar, and
    a transmitting part which transmits the distance data for the virtual 2D laser radar which is assumed to be arranged on the same location as the lower 2D laser radar, generated by the ground and obstacle determining part, to a collision avoiding processing unit of the autonomous mobile vehicle.

2. A method for distinguishing between ground and an obstacle for autonomous mobile vehicle by using the apparatus for distinguishing between ground and an obstacle for autonomous mobile vehicle of claim 1, which comprises:
    obtaining distance data in which distance data $r_1$, $r_2$ from the upper 2D laser radar and the lower 2D laser radar to the detected object is obtained by using the upper 2D laser radar and the lower 2D laser radar installed on front side of the autonomous mobile vehicle;
    calculating inclination in which the actual inclination g of the detected object is calculated by the inclination calculating part of the apparatus for distinguishing between ground and an obstacle for autonomous mobile vehicle by using the distance data $r_1$, $r_2$, the orientation angle $\theta_1$ of the upper 2D laser radar, and the vertical distance $d_{offset}$ between the upper 2D laser radar and the lower 2D laser radar, wherein g is calculated by the following formula:

$$g = d_v/d_h \times 100$$

where, $d_v = d_{offset} - r_1 \sin \theta_1$, and
$d_h = r_1 \cos \theta_1 - r_2$, where $d_v$ is the difference in vertical direction between the distance data $r_1$ to the detected object and distance data $r_2$ to the detected object, and where $d_h$ is the difference in horizontal direction between the distance data $r_1$ to the detected object and distance data $r_2$ to the detected object; and
    determining whether the detected object is ground an obstacle in which the ground and obstacle determining part of the processing unit determines the detected object as an obstacle when the actual inclination g of the detected object is larger than the reference inclination, and determines the detected object as ground when the actual inclination g of the detected object is smaller than the reference inclination.

3. The method for distinguishing between ground and an obstacle for autonomous mobile vehicle of claim 2, wherein the minimum value of the obtained distance data $r_1$, $r_2$ is stored as a distance data at the angle of the virtual 2D laser radar which is assumed to be arranged on the same location as the lower 2D laser radar when the actual inclination g of the detected object at a certain angle is larger than predetermined reference inclination, and the arbitrary maximum value of the distance that the corresponding 2D laser radar can have is stored as a distance data at the angle of the virtual 2D laser radar which is assumed to be arranged on the same location as the lower 2D laser radar when the actual inclination g of the detected object is smaller than predetermined reference inclination.

* * * * *

UNITED STATES PATENT AND TRADEMARK OFFICE
CERTIFICATE OF CORRECTION

Page 1 of 1

PATENT NO. : 8,736,820 B2
APPLICATION NO. : 13/254099
DATED : May 27, 2014
INVENTOR(S) : Choe et al.

It is certified that error appears in the above-identified patent and that said Letters Patent is hereby corrected as shown below:

In the Claims

Claim 1, column 7, line 57, delete "are".

Signed and Sealed this
Sixteenth Day of December, 2014

Michelle K. Lee
*Deputy Director of the United States Patent and Trademark Office*